United States Patent
Chang et al.

(10) Patent No.: US 9,613,067 B2
(45) Date of Patent: Apr. 4, 2017

(54) DEFINING AND TRANSFORMING ENTITY RELATIONSHIP-XML HYBRID DATA MODELS

(71) Applicant: International Business Machines Corporation, Armonk, NY (US)

(72) Inventors: Daniel T. Chang, San Jose, CA (US); Hemant S. Kolwalkar, Renton, WA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/164,078

(22) Filed: Jan. 24, 2014

(65) Prior Publication Data

US 2015/0213151 A1 Jul. 30, 2015

(51) Int. Cl.
*G06F 17/30* (2006.01)

(52) U.S. Cl.
CPC .. *G06F 17/30292* (2013.01); *G06F 17/30604* (2013.01)

(58) Field of Classification Search
CPC ......... G06F 17/30923; G06F 17/30292; G06F 17/30595; G06F 17/30604
See application file for complete search history.

(56) References Cited

U.S. PATENT DOCUMENTS

| | | |
|---|---|---|
| 6,785,685 B2 | 8/2004 | Soetarman et al. |
| 7,765,241 B2 | 7/2010 | Westerinen et al. |
| 7,805,474 B2 | 9/2010 | Warshavsky et al. |
| 7,831,632 B2 | 11/2010 | Djugash et al. |
| 8,078,643 B2 | 12/2011 | Mush et al. |
| 8,260,824 B2 | 9/2012 | Mao et al. |
| 8,321,478 B2 | 11/2012 | Fong |
| 8,356,029 B2 | 1/2013 | Djugash et al. |

(Continued)

OTHER PUBLICATIONS

Mirella M. Moro, Lipyeow Lim, and Yuan-Chi Chang. 2007. Schema advisor for hybrid relational-XML DBMS. In Proceedings of the 2007 ACM SIGMOD international conference on Management of data (SIGMOD '07). ACM, New York, NY, USA, 959-970. Retreived from <http://dl.acm.org/citation.cfm?id=1247592>.*

(Continued)

*Primary Examiner* — Robert Beausoliel, Jr.
*Assistant Examiner* — Arthur Ganger
(74) *Attorney, Agent, or Firm* — North Shore Patents, P.C.; Michele Liu Baillie (57) ABSTRACT

An entity-relationship (ER)-eXtensible Markup Language (XML) hybrid data model includes an unmarked entity and an entity marked to be transformed as an XML column. In transforming the ER-XML hybrid data model to a physical data model, the unmarked entity is transformed to a table in the physical data model. It is determined whether the marked entity has an unmarked parent entity. If so, the marked entity, and the transitive closure of the marked entity, is transformed to an XML column in a table representing the unmarked parent entity in the physical data model, an XML schema document (XSD) for the XML column is generated, and the XSD is associated with the XML column. A relational-XML hybrid data model includes one or more XML columns marked to transform to a set of entities in the ER model by expanding the contents of the XSD associated with the XML column.

20 Claims, 7 Drawing Sheets

(56) References Cited

U.S. PATENT DOCUMENTS

| | | |
|---|---|---|
| 2002/0129001 A1 | 9/2002 | Levkoff et al. |
| 2004/0128296 A1* | 7/2004 | Krishnamurthy . G06F 17/30595 |
| 2007/0083543 A1* | 4/2007 | Chen ................ G06F 17/30604 |
| 2013/0060816 A1 | 3/2013 | Hui et al. |

OTHER PUBLICATIONS

Baqasah et al.; "Managing Schema Evolution in Hybrid XML-Relational Database Systems", IEEE/WAINA 24th International Conference on, Apr. 20-23, 2010, pp. 455-460.

ip.com et al.; "System And Method For Transforming Entity Relationship Models Into OWL Ontologies And Vice Versa", IPCOM000226433D, Apr. 3, 2013, pp. 1-7.

Moro et al.; "Schema Advisor For Hybrid Relational-XML DBMS", Proceedings Of The 2007 ACM/SIGMOD International Conference on, 2007, pp. 1-13.

\* cited by examiner

DEFINING AND TRANSFORMING ENTITY RELATIONSHIP-XML HYBRID DATA MODELS

BACKGROUND

The entity relationship (ER) data model is widely used for logical data modeling. It supports data modeling at the business level in terms of entities, attributes and relationships. ER data models are valuable assets to an enterprise because they represent the enterprise's information model and serve as the common base for generating or correlating various physical data assets, such as physical data models representing relational databases or eXtensible Markup Language (XML) schemas.

XML is a widely used standard for data interchange among diverse devices, applications, and systems across industries and sectors. The volume of XML data that organizations must handle is growing exponentially. As such, XML data now needs storage and management services with the same reliability, availability, and scalability afforded to traditional data assets. Also, XML data might have to be integrated with traditional data. The XML data and documents may contain valuable information such as customer details, transaction data, order records, and operational documents. Often the metadata for such information already exists in enterprise ER data models. The enterprise may wish to define the metadata in ER data models redundantly in XML schemas to facilitate data interchange or to capture business metadata in XML schemas redundantly in ER data models to facilitate metadata governance. At times part of this metadata might need to be manifested as XML schemas for use in applications and XML data stores, alongside those manifested as physical data models for use in designing traditional relational databases.

SUMMARY

According to one embodiment of the present invention, a method provides an ER-XML hybrid data model that includes at least one unmarked entity and at least one entity marked to be transformed as an XML column. The ER-XML hybrid data model is transformed by a computing processor to a physical data model. The transformation includes transforming the at least one unmarked entity to a table in the physical data model and determining whether the at least one marked entity has an unmarked parent entity. In response to determining that the at least one marked entity has the unmarked parent entity, the at least one marked entity and a transitive closure of the at least one marked entity are transformed to an XML column in a table representing the unmarked parent entity in the physical data model, an XML schema document (XSD) for the XML column is generated, and the XSD is associated with the XML column.

In one aspect of the present invention, in generating the XSD for the XML column, the method includes information on the at least one marked entity in the XSD, on any subtype entity of the at least one marked entity in the XSD, on any supertype entity of the at least one marked entity in the XSD, and on any child entity of a relationship referencing the at least one marked entity as parent in the XSD.

In one aspect of the present invention, in including the information on any subtype of the at least one marked entity in the XSD, the method also recursively includes information on any subtype entity of the subtype entity in the XSD.

In one aspect of the present invention, in including the information on any supertype of the at least one marked entity in the XSD, the method also recursively includes information on any supertype entity of the supertype entity in the XSD.

In one aspect of the present invention, in including the information on any child entity of a relationship referencing the at least one marked entity as parent in the XSD, the method also recursively includes information on any child entity of a relationship referencing the child entity as parent in the XSD.

In one aspect of the present invention, in including the information on any supertype or subtype entity of the at least marked entity, the method also recursively includes information on any child entity of a relationship referencing the supertype or subtype entity as parent.

In one aspect of the present invention, in including the information on any child entity of a relationship referencing the at least one marked entity as parent in the XSD, the method also includes information on any supertype entity of the child entity in the XSD.

In one aspect of the present invention, the transformation of the ER-XML hybrid data model to the physical data model further includes determining whether the at least one marked entity has no unmarked parent entity or has no parent entity, and in response to determining that the at least one marked entity has no unmarked parent entity or has no parent entity, skipping the transformation of the at least one marked entity.

In one aspect of the present invention, a physical data model/relational-XML hybrid data model is provided to include at least one unmarked XML column and at least one XML column marked to be transformed as an entity. The physical data model/relational-XML hybrid data model is transformed to an ER-XML hybrid data model. The transformation includes: transforming the at least one marked XML column to an entity in the ER-XML hybrid data model; creating at least one entity in the ER-XML hybrid data model for contents of an XSD associated with the at least one marked XML column; and transforming the at least one unmarked XML column as an XML attribute in a parent entity associated with the same XSD that is associated with the at least one unmarked XML column.

System and computer program products corresponding to the above-summarized methods are also described and claimed herein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention provide the capability to define ER-XML hybrid data models. The ER-XML hybrid data models retain the ER semantics while imparting a way to overlay the model elements with XML semantics. This enables the re-use of existing enterprise ER metadata. Embodiments of the present invention further provide the capability to extend relational database schemas with relational-XML hybrid data models. The relational-XML hybrid data models retain the existing relational semantics while imparting a way to overlay the XML columns with ER semantics. This enables the re-use of existing physical data models for enterprise metadata generation.

Figure 1:
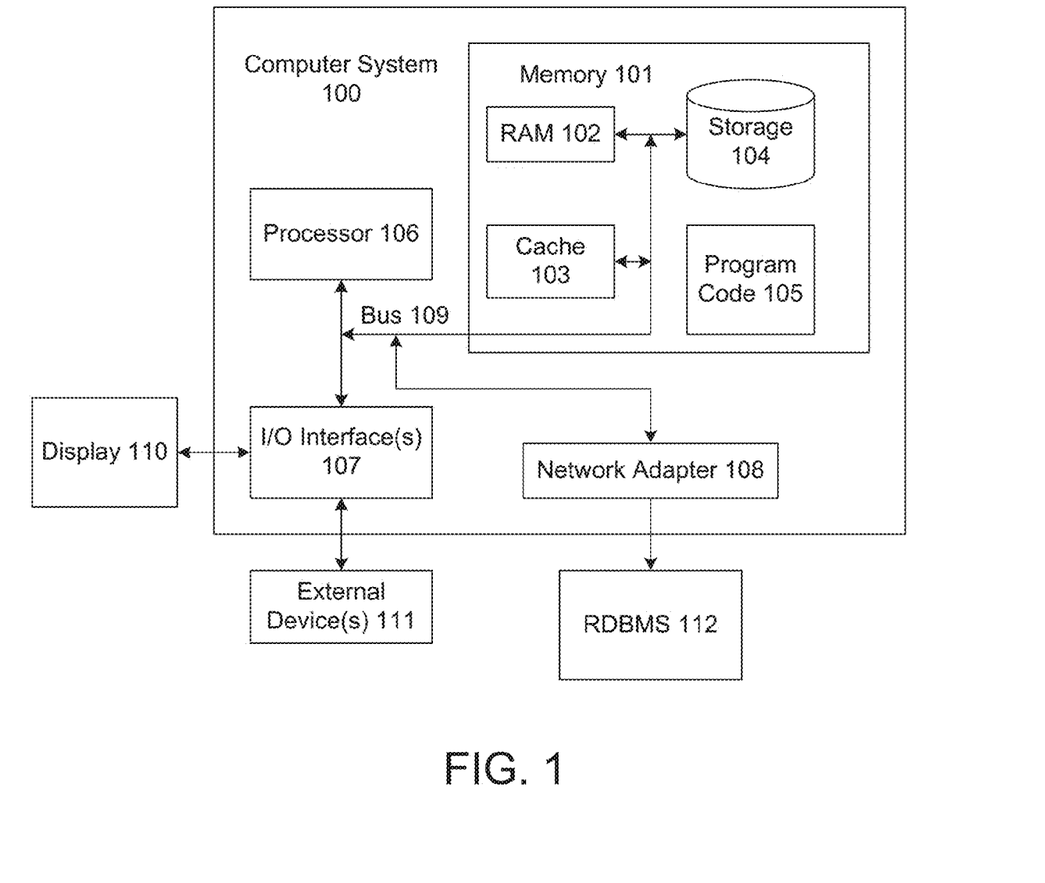
FIG. 1 illustrates a system for defining and transforming ER-XML hybrid data models according to embodiments of the present invention.

FIG. 1 illustrates a system for defining and transforming hybrid data models according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more relational database management systems 112 via network adapter 108.

Enterprise data models are often logical data models defined using the ER model. In order to define XML data non-intrusively in such models with an intention to re-use metadata in the ER model, embodiments of the present invention provide users with the capability to mark or annotate existing logical data elements as XML data. In this embodiment, the ER model is enhanced to allow the specification of a "Transform As" option on an entity in the ER model with the following possible values: Table (which may be the default value); and XML column. The Transform As option is then applied when the ER model is transformed to a physical data model. In the transformation, an entity marked with the "Table" option is transformed to a relational table. An entity annotated with the "XML column" option is transformed, along with its transitive closure, to an XML column in one or more parent tables, and an XML schema is generated with the entity as the root element. The "Transform As-XML column" marking enables a user to mark any entity, and its transitive closure, of an ER model as representing XML data, thus extending the ER data model for ER-XML hybrid data modeling. The "Transform As" annotation is non-intrusive and allows the same ER model, with different "Transform As" markings on various entities, to be transformed into different physical data models.

Figure 2:
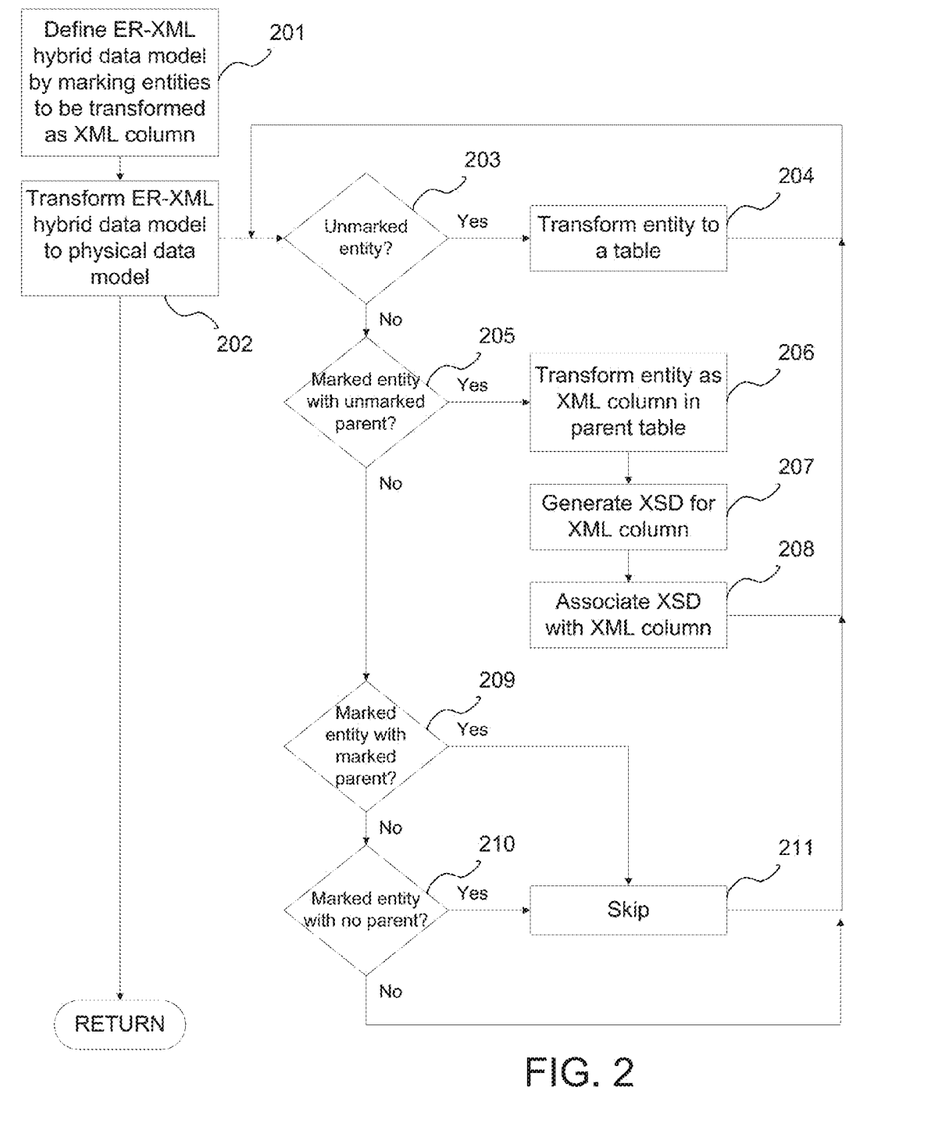
FIG. 2 is a flowchart illustrating the defining and transforming of an ER-XML hybrid data model to a physical data model according to embodiments of the present invention.

FIG. 2 is a flowchart illustrating the defining and transforming of an ER-XML hybrid data model to a physical data model according to embodiments of the present invention. First, a user defines the ER-XML hybrid data model by marking one or more entities in the ER data model to be transformed as an XML column (201). In this embodiment, the entities may be marked with either the Table or the XML column option, as described above. Other manners of marking entities may be used without departing from the spirit and scope of the present invention. The ER-XML hybrid data model may then be transformed to a physical data model (202), such as a relational-XML hybrid data model. Steps 203-211 illustrate an embodiment of the transformation of an ER-XML hybrid data model to a relational-XML hybrid data model. In the transformation, each entity in the ER-XML hybrid data model is traversed. When an entity is unmarked (203), i.e., not marked as XML data, the entity is transformed to a table in the physical data model (204). In this embodiment, the entity is considered "unmarked" when the "Transform As" option value on the entity is "Table". When an entity is marked and the entity has an unmarked parent entity (205), then the entity is transformed to an XML column in the table of the parent entity (206). Since the parent entity is unmarked, the parent entity would be transformed to a table per step 204, and the marked entity would be transformed as an XML column in this table. In this embodiment, the entity is considered "marked" when the "Transform As" option value on the entity is "XML column". In addition to being transformed as an XML column per step 206, an XML schema document (XSD) is generated for the XML column (207), and the XSD is associated with the XML column (208) in the physical data model. The XSD contains information on the entity and its transitive closure. The generation of the XSD is described in more detail further below. When the entity has multiple unmarked parent entities, then the entity would be transformed as an XML column, and associated with an XSD, in the table of each parent entity per steps 206-208. When an entity is marked and has a marked parent entity (209), then the entity is not transformed. This is because the marked parent entity would be transformed as an XML column per steps 206-208, and the entity would be part of the marked parent entity's transitive closure. Thus, information about the entity would already exist in the XSD associated with the XML column for the marked parent entity, and the transformation of the entity would be redundant. When an entity is marked but has no parent entity (210), then the entity has no corresponding structure in the physical data model since there is no parent table for the XML column to be a part of. The transformation of the entity is thus skipped (211). When an entity has an unmarked parent entity and a marked parent entity, then the entity would be transformed as an XML column in the table of the unmarked parent entity per steps 206-208, but would not be transformed as a child of the marked parent entity per step 209. When an entity is unmarked and has a marked parent entity, the entity would be transformed to a table per step 204. The entity would also be part of the XSD associated with the XML column for the marked parent entity, transformed per steps 206-208.

Figure 3:
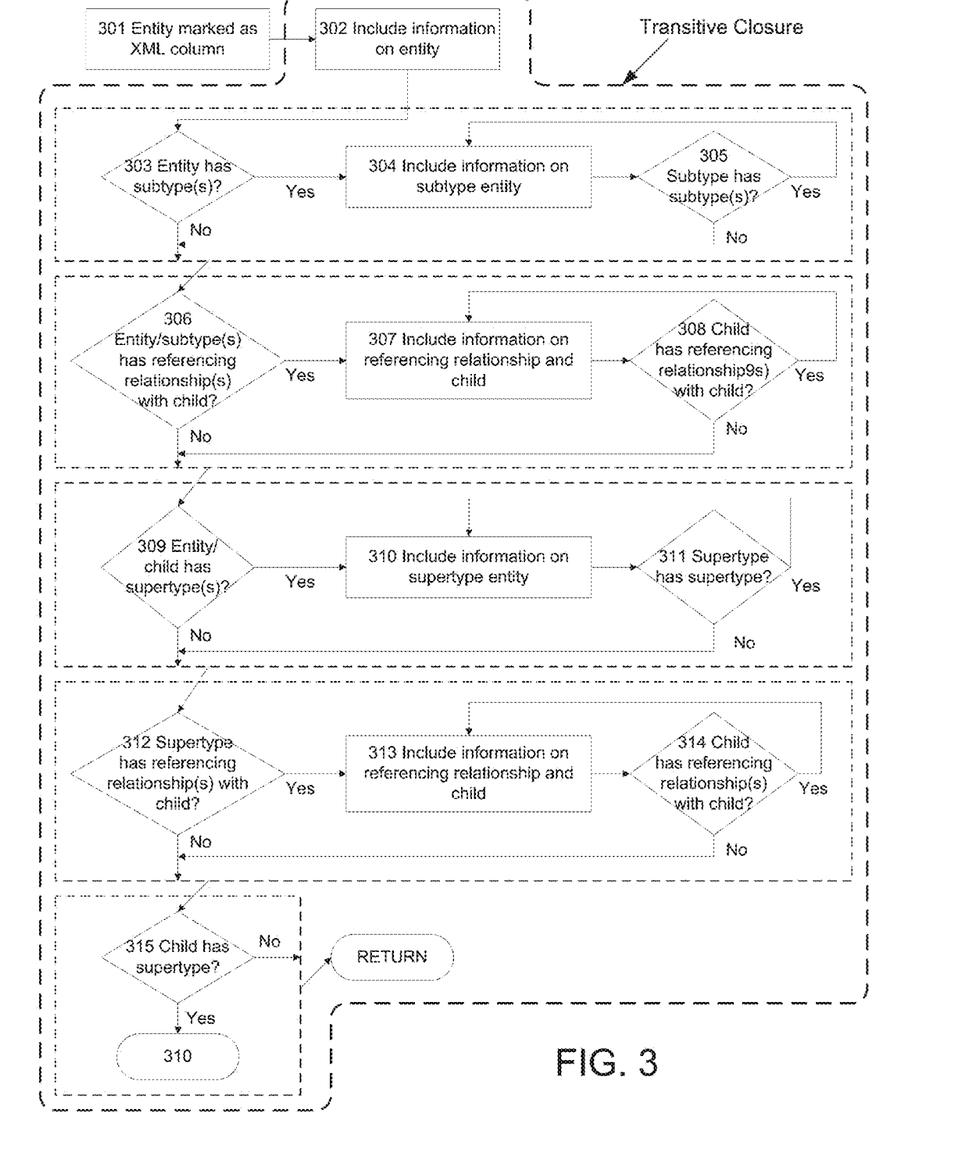
FIG. 3 is a flowchart illustrating the generation of an XSD for an XML column in the transformation of an ER-XML hybrid data model to a physical data model according to embodiments of the present invention.

FIG. 3 is a flowchart illustrating the generation of an XSD for an XML column in the transformation of an ER-XML hybrid data model to a physical data model according to embodiments of the present invention. When an entity is marked as an XML column (301), information on the entity is included in the XSD (302). In order to capture information on other entities reachable from the entity, a transitive closure algorithm is used. Steps 303-315 illustrate an example of such a transitive closure algorithm. When the entity has one or more subtype entities (303), information on each subtype entity is included in the XSD (304). Information on each subtype entity of each subtype entity is also recursively included in the XSD (304-305). For each child entity of a relationship referencing the entity or one of the entity's subtype entities as parent (306), information on each referencing relationship and each child entity is included in the XSD (307). Information on each child entity of a relationship referencing one of the child entities as parent is also recursively included in the XSD (307-308). For each supertype of the entity and the entity's child entities (309), information on each supertype entity is included in the XSD (310). Information on each supertype entity of each supertype entity is also recursively included in the XSD (310-311). For each child entity of a relationship referencing one of the entity's supertype entities as parent (312), information on each referencing relationship and each child entity are included in the XSD (313). Information on each child entity of a referencing relationship referencing one of the child entities as parent is recursively included in the XSD (313-314). For each supertype of each of the entity's child entities (315), information on each supertype entity and their supertype entities are recursively included in the XSD (310-311).

Figure 4:
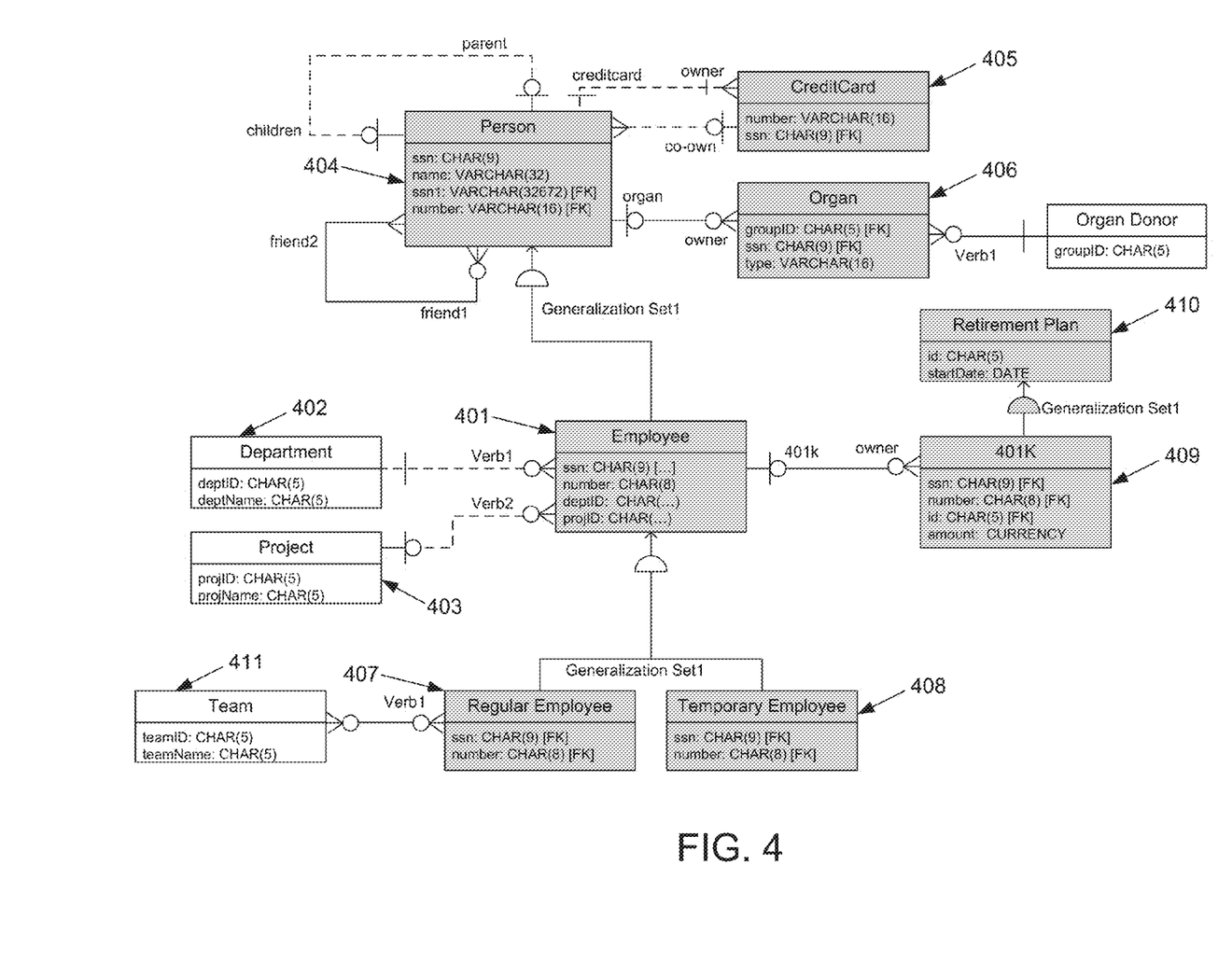
FIG. 4 illustrates an example ER-XML hybrid data model defined according to embodiments of the present invention.

FIG. 4 illustrates an example ER-XML hybrid data model defined according to embodiments of the present invention. Assume in this example that the Employee entity 401 is marked as an XML column. The Employee entity 401 has two unmarked parent entities, Department 402 and Project 403. Referring also to FIG. 2, the Department entity 402 is transformed to a Department table in the physical data model, and the Project entity 403 is transformed to a Project table in the physical data model (204). When the Employee entity 401 is transformed as a marked entity with unmarked parent entities (205), information on the Employee entity 401 is transformed to an XML column in the Department table and to an XML column in the Project table (206). One XSD is generated for and associated with the Employee XML column in the Department table, and another XSD is generated for and associated with the Employee XML column in the Project table (207-208). Referring also to FIG. 3, in generating the XSD associated with the Employee XML column, information on the Employee entity 401 is included (302). The Employee entity 401 has two subtype entities, Regular Employee 407 and Temporary Employee 408 (303), so information on the Regular Employee 407 and Temporary Employee entities 408 are included (304). In this example, neither the Regular Employee 407 nor the Temporary Employee entity 408 have subtypes (305). The Employee entity 401 has a supertype entity, Person 404 (309), so information on the Person entity 404 is included (310). The Person entity 404 has referencing relationships with two child entities, CreditCard 405 and Organ 406 (312), so information on the CreditCard 405 and Organ 406 entities are included (313). The Employee entity 401 has a referencing relationship with child entity, 401k 409 (306), so information on the 401k entity 409 is included (307). The child entity 401k 409 has a supertype entity, Retirement Plan 410 (315), so information on the Retirement Plan entity 410 is included (310).

Below is a resulting example XSD for the Employee entity 401:

```
<xsd:complexType name="Employee">
    <xsd:complexContent>
        <xsd:extension base="Q1:Person">
            <xsd:sequence>
                <xsd:element name="number">
                    <xsd:simpleType>
                        <xsd:restriction base="xsd:string">
                            <xsd:length value="8"/>
                        </xsd:restriction>
                    </xsd:simpleType>
                </xsd:element>
                <xsd:element maxOccurs="unbounded" minOccurs="0" name="_401k" type="Q1:_401K"/>
            </xsd:sequence>
        </xsd:extension>
    </xsd:complexContent>
</xsd:complexType>
<xsd:element name="Employee" type="Q1:Employee">
    <xsd:key name="Employee_Employee_PrimaryKey">
        <xsd:selector xpath="."/>
        <xsd:field xpath="number"/>
        <xsd:field xpath="ssn"/>
    </xsd:key>
</xsd:element>
<xsd:complexType name="_401K">
    <xsd:complexContent>
        <xsd:extension base="Q1:Retirement_Plan">
            <xsd:sequence>
                <xsd:element minOccurs="0" name="amount">
                    <xsd:simpleType>
                        <xsd:restriction base="xsd:decimal>
                            <xsd:totalDigits value="10"/>
                            <xsd:fractionDigits value="4"/>
                        </xsd:restriction>
                    </xsd:simpleType>
                </xsd:element>
            </xsd:sequence>
        </xsd:extension>
    </xsd:complexContent>
</xsd:complexType>
<xsd:complexType name="Retirement_Plan">
    <xsd:sequence>
        <xsd:element name="id">
            <xsd:simpleType>
                <xsd:restriction base="xsd:string">
```

```xml
            <xsd:length value="5"/>
          </xsd:restriction>
        </xsd:simpleType>
      </xsd:element>
      <xsd:element minOccurs="0" name="startDate" type="xsd:date"/>
    </xsd:sequence>
  </xsd:complexType>
  <xsd:complexType name="Person">
    <xsd:sequence>
      <xsd:element name="ssn">
        <xsd:simpleType>
          <xsd:restriction base="xsd:string">
            <xsd:length value="9"/>
          </xsd:restriction>
        </xsd:simpleType>
      </xsd:element>
      <xsd:element minOccurs="0" name="name">
        <xsd:simpleType>
          <xsd:restriction base="xsd:string">
            <xsd:maxLength value="32"/>
          </xsd:restriction>
        </xsd:simpleType>
      </xsd:element>
      <xsd:element maxOccurs="unbounded" minOccurs="0" name="organ" type="Q1:Organ"/>
      <xsd:element maxOccurs="unbounded" minOccurs="1" name="creditcard" type="Q1:CreditCard"/>
      <xsd:element maxOccurs="unbounded" minOccurs="0" name="friend2" type="Q1:Person"/>
      <xsd:element maxOccurs="1" minOccurs="0" name="children" type="Q1:Person"/>
    </xsd:sequence>
  </xsd:complexType>
  <xsd:complexType name="Organ">
    <xsd:sequence>
      <xsd:element minOccurs="0" name="type">
        <xsd:simpleType>
          <xsd:restriction base="xsd:string">
            <xsd:maxLength value="16"/>
          </xsd:restriction>
        </xsd:simpleType>
      </xsd:element>
    </xsd:sequence>
  </xsd:complexType>
  <xsd:complexType name="CreditCard">
    <xsd:sequence>
      <xsd:element name="number">
        <xsd:simpleType>
          <xsd:restriction base="xsd:string">
            <xsd:maxLength value="16"/>
          </xsd:restriction>
        </xsd:simpleType>
      </xsd:element>
      <xsd:element maxOccurs="5" minOccurs="2" name="co-owner" type="Q1:Person"/>
    </xsd:sequence>
  </xsd:complexType>
  <xsd:complexType name="Regular_Employee">
    <xsd:complexContent>
      <xsd:extension base="Q1:Employee">
        <xsd:sequence/>
      </xsd:extension>
    </xsd:complexContent>
  </xsd:complexType>
  <xsd:element name="Regular_Employee" type="Q1:Regular_Employee">
    <xsd:key name="Employee_Regular_Employee_PrimaryKey">
      <xsd:selector xpath="."/>
      <xsd:field xpath="number"/>
      <xsd:field xpath="ssn"/>
    </xsd:key>
  </xsd:element>
  <xsd:complexType name="Temporary_Employee">
    <xsd:complexContent>
      <xsd:extension base="Q1:Employee">
        <xsd:sequence/>
      </xsd:extension>
    </xsd:complexContent>
  </xsd:complexType>
  <xsd:element name="Temporary_Employee" type="Q1:Temporary_Employee">
    <xsd:key name="Employee_Temporary_Employee_PrimaryKey">
      <xsd:selector xpath="."/>
```

```
    <xsd:field xpath="number"/>
    <xsd:field xpath="ssn"/>
  </xsd:key>
</xsd:element>
```

Figure 5:
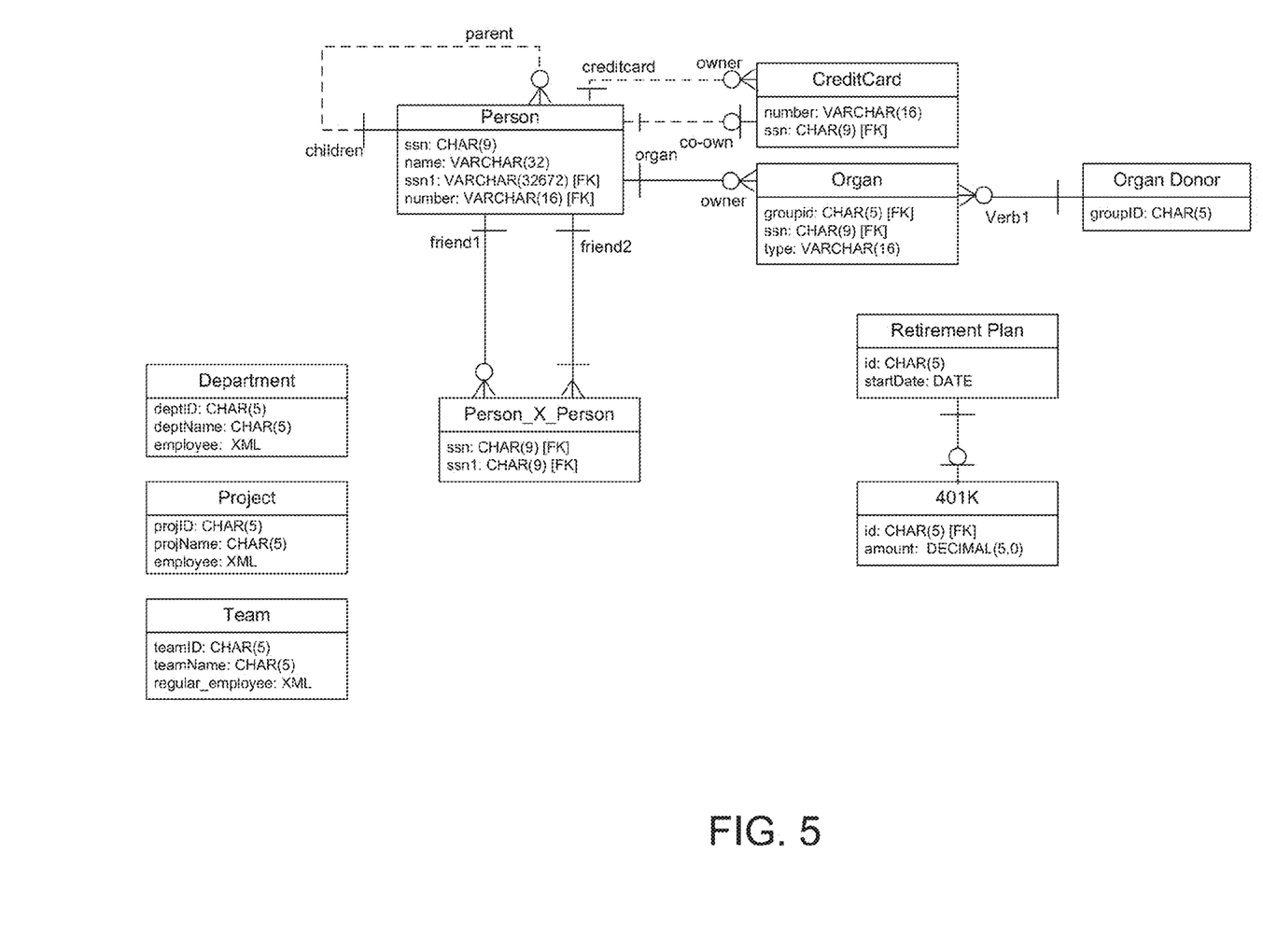
FIG. 5 illustrates an example physical data model/relational-XML hybrid data model transformed according to embodiments of the present invention.

FIG. 5 illustrates an example physical data model transformed according to embodiments of the present invention. In this example, since the Regular Employee entity 407 and the Temporary Employee entity 408 are included in the XSD of the Employee entity 401, the Regular Employee and Temporary Employee 408 entities are absent from the physical data model per steps 209-211 of FIG. 2. However, the Regular Employee entity 407 also has an unmarked parent entity, Team 411 (205). The Regular Employee entity 407 thus is transformed as an XML column in the table for the Team entity 411 (206), and an XSD is be generated and associated with the Regular Employee XML column (207-208) in the Team table. Since the Temporary Employee 408 has no referencing relationships, it is not transformed to an XML column and no corresponding XSD is generated.

Another embodiment of the present invention provides the capability to extend relational schemas to relational-XML hybrid data models. In this embodiment, the physical data model is enhanced to allow the specification of a "Transform As" option on an XML column with the following possible values: XML Attribute (which may be the default value); and Entities. The Transform As option is then applied when the relational-XML hybrid data model is transformed to an ER model. In the transformation, an XML column marked with the "XML Attribute" option is transformed to a logical XML attribute, preserving the XML schema identifiers. An XML column marked with the "Entities" option is transformed to a set of entities in the ER model by expanding the contents of the XSD associated with the XML column. This embodiment enables a user to mark any XML column of a physical data model as representing entity-relationship metadata, thus extending the relational schema to support ER-XML hybrid data modeling. The "Transform As" annotation is non-intrusive and allows the same physical data model, with different "Transform As" markings on various XML columns, to be transformed into different ER models.

Figure 6:
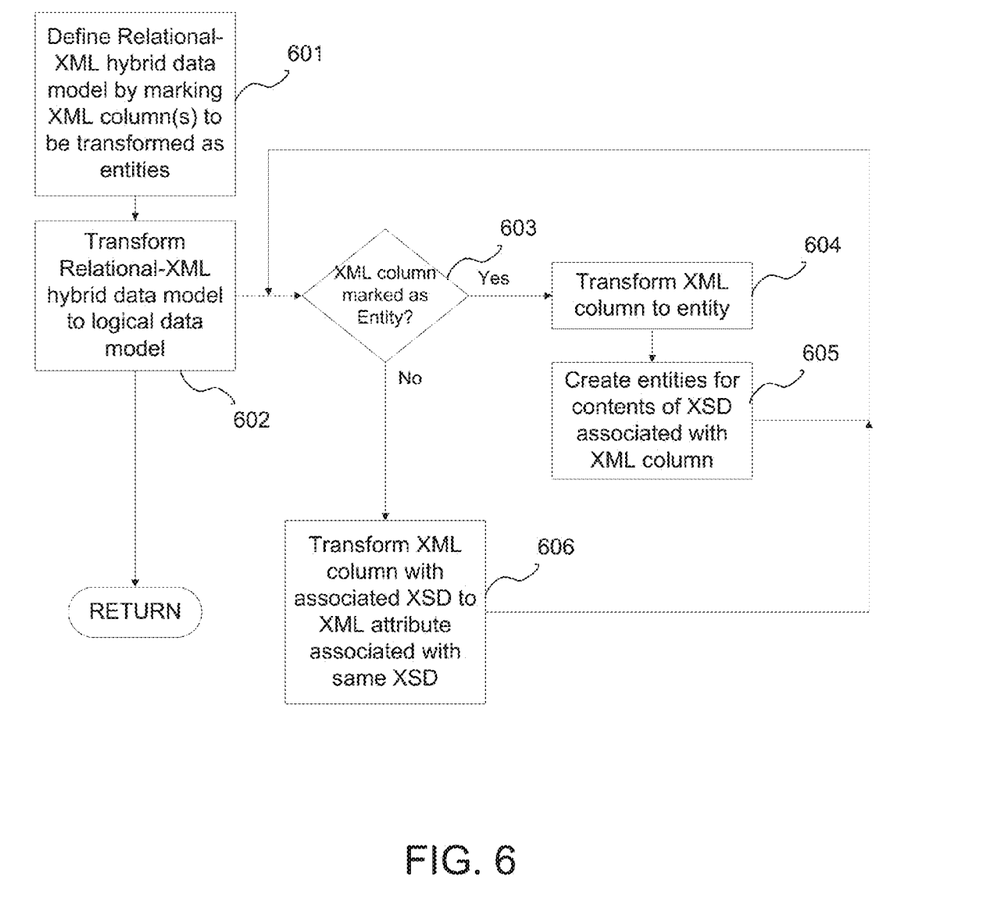
FIG. 6 is a flowchart illustrating the defining and transforming of a relational-XML hybrid data model to an ER-XML hybrid data model according to embodiments of the present invention.

FIG. 6 is a flowchart illustrating the defining and transforming of a relational-XML hybrid data model to an ER-XML hybrid data model according to embodiments of the present invention. First, a user defines a relational-XML hybrid data model by marking one or more XML columns to be transformed as entities (601). In this embodiment, the XML columns may be marked with either the XML Attribute or the Entities option, as described above. Other manners of marking XML columns may be used without departing from the spirit and scope of the present invention. The relational-XML hybrid data model may then be transformed to a logical data model (602), such as an ER-XML hybrid data model. Steps 603-606 illustrate an embodiment of the transformation of a relational-XML hybrid data model to an ER-XML hybrid data model. In the transformation, each XML column in the relational-XML hybrid data model is traversed. When an XML column is marked as an Entity (603), the XML column is transformed to an entity in the ER-XML hybrid data model (604). The contents of the XSD associated with XML column are expanded, where entities described in the XSD are created in the ER-XML hybrid data model (605). When the XML column is not marked as an Entity, the XML column with its associated XSD is transformed to an XML attribute in the parent entity (the entity representing the table within which the XML column resides) and associated with the same XSD (606).

For example, in the example physical data model/relational-XML hybrid data model illustrated in FIG. 5, assume that the Employee XML column in the Department table, the Employee XML column in the Project table, and the Regular Employee XML column in the Team table are each marked with "Transform As-Entities". When each of these XML columns is transformed, an Employee entity and a Regular Employee entity are created (605). The contents of the XSD's associated with the XML columns are then expanded to create other entities described in the XSD's (606).

Figure 7:
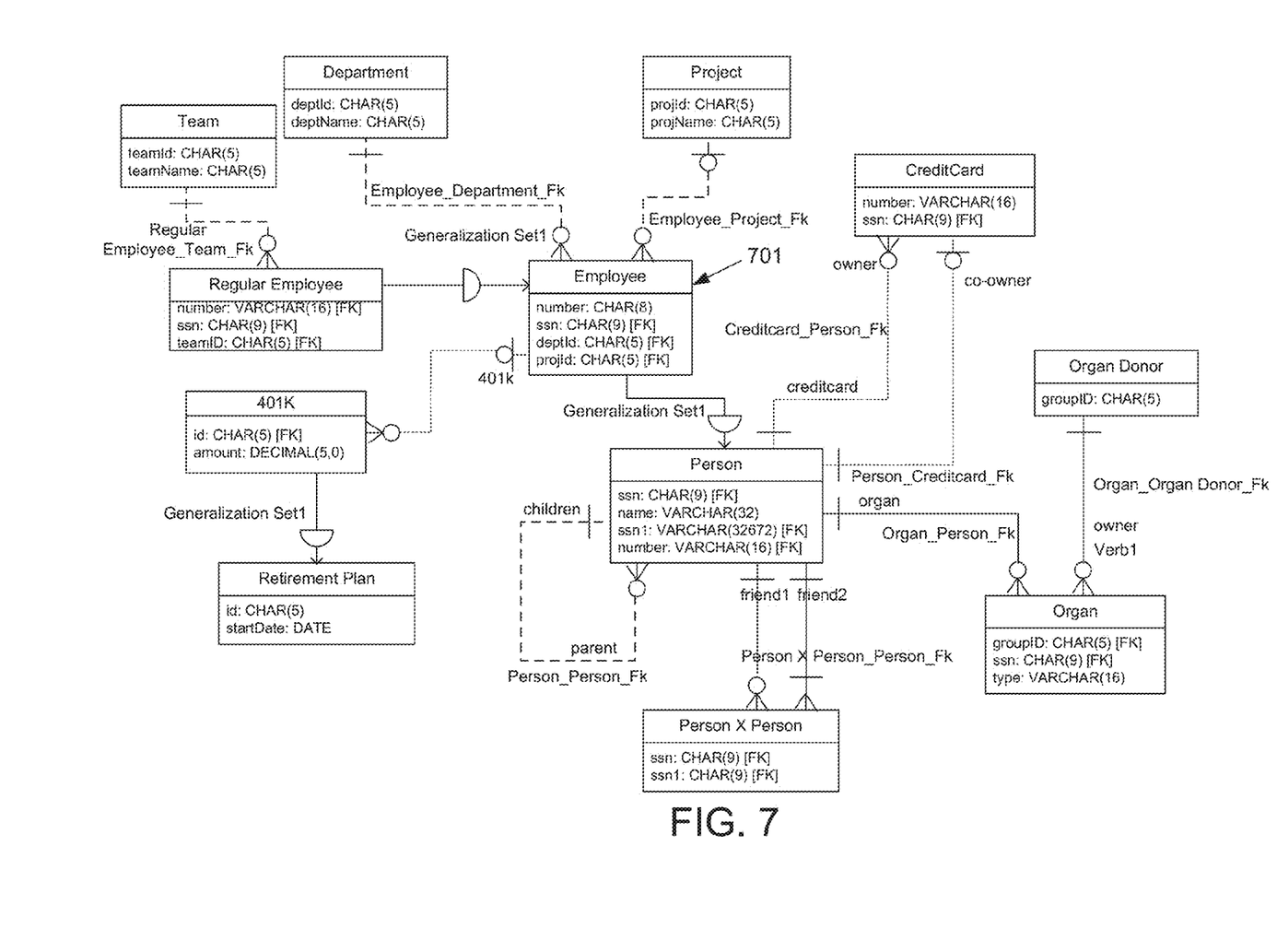
FIG. 7 illustrates an example ER-XML hybrid data model transformed from the example relational-XML hybrid data model.

FIG. 7 illustrates an example ER-XML hybrid data model transformed from the example relational-XML hybrid data model. In place of the three XML columns, three new relationships are created in the logical data model: Department-Employee, Project-Employee, and Team-Regular Employee. The Employee entity 701 would be marked with the "Transform As-XML Column" annotation. Although there are two Employee XML columns, one in the Department table and one in the Project table, only one Employee entity 701 is created in order to avoid redundancy. No entity is created for the Temporary Employee element in the XSD associated with the Employee XML column, as the transitive closure is computed up and out from the root element, which in this example is the Employee element.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing an entity-relationship (ER)-extensible markup language (XML) hybrid data model of a relational database comprising XML data;
receiving a user setting of a first annotation of a first entity in the ER-XML hybrid data model marking the first entity as not to be transformed as XML data;
receiving a user setting of a second annotation of a second entity in the ER-XML hybrid data model marking the second entity as to be transformed as XML data; and
transforming, by a computing processor, the ER-XML hybrid data model to a physical data model of the relational database, comprising:
based on the first annotation of the first entity marking the first entity as not to be transformed as XML data, transforming the first entity in the ER-XML hybrid data model to a first table in the physical data model;

based on the second annotation of the second entity marking the second entity as to be transformed as XML data, determining whether the second entity has a parent entity in the ER-ML hybrid data model with a third annotation marking the parent entity as not to be transformed as XML data; and in response to determining that the second entity has the parent entity with the third annotation marking the parent entity as not to be transformed as XML data:

transforming the second entity and a transitive closure of the second entity to an XML column in a second table in the physical data model, the second table representing the parent entity in the ER-XML hybrid data model marked as not to be transformed as XML data;

generating an XML schema document (XSD) for the XML column; and associating the XSD with the XML column in the physical data model.

2. The method of claim 1, wherein the generating of the XSD for the XML column comprises:

including information on the second entity in the XSD;

including information on any subtype entity of the second entity in the XSD;

including information on any supertype entity of the second entity in the XSD; and including information on any child entity of a relationship referencing the second entity as parent in the XSD.

3. The method of claim 2, wherein the including of the information on any subtype of the second entity in the XSD further comprises: recursively including information on any subtype entity of the subtype entity in the XSD.

4. The method of claim 2, wherein the including of the information on any supertype of the second entity in the XSD further comprises: recursively including information on any supertype entity of the supertype entity in the XSD.

5. The method of claim 2, wherein the including of the information on any child entity of a relationship referencing the second entity as parent in the XSD comprises: recursively including information on any child entity of a relationship referencing the second entity as parent in the XSD.

6. The method of claim 2, wherein the including of the information on any supertype or subtype entity of the second entity comprises: recursively including information on any child entity of a relationship referencing the supertype or subtype entity as parent in the XSD.

7. The method of claim 2, wherein the including of the information on any child entity of a relationship referencing the second entity as parent in the XSD comprises: including information on any supertype entity of the child entity in the XSD.

8. The method of claim 1, further comprising:

providing the physical data model comprising a fourth annotation of a first XML column marking the first XML column as not to be transformed as an entity and a fifth annotation of a second XML column marking the second XML column as to be transformed as an entity; and transforming the physical data model to a second ER-XML hybrid data model, comprising:

based on the fifth annotation of the second XML column marking the second XML column as to be transformed as an entity, transforming the second XML column to a first entity in the second ER-XML hybrid data model;

creating at least a second entity in the second ER-XML hybrid data model for contents of an XSD associated with the second XML column; and based on the fourth annotation of the first XML column marking the first XML column as not to be transformed as an entity, transforming the first XML column as a XML attribute in a parent entity and associated with the same XSD as the second XML column.

9. A computer program product comprising:

a computer readable storage medium having computer readable program code embodied therewith, the program code executable by a processor to:

provide an entity-relationship (ER)-extensible markup language (XML) hybrid data model of a relational database comprising XML data;

receive a user setting of a first annotation of a first entity in the ER-XML hybrid data model marking the first entity as not to be transformed as XML data;

receive a user setting of a second annotation of a second entity in the ER-XML hybrid data model marking the second entity as to be transformed as XML data;

transform the ER-XML hybrid data model to a physical data model of the relational database, comprising:

based on the first annotation of the first entity marking the first entity as not to be transformed as XML data, transform the first entity marked to a first table in the physical data model;

based on the second annotation of the second entity marking the second entity as to be transformed as XML data, determine whether the second entity has a parent entity in the ER-XML hybrid data model with a third annotation marking the parent entity as not to be transformed as XML data; and in response to determining that second entity has the parent entity with the third annotation marking the parent entity as not to be transformed as XML data:

transform the second entity and a transitive closure of the second entity to an XML column in a second table in the physical data model, the second table representing the parent entity in the ER-XML data model marked as not to be transformed as XML data;

generate an XML schema document (XSD) for the XML column; and associate the XSD with the XML column in the physical data model.

10. The computer program product of claim 9, wherein the program code executable by the processor to generate the XSD for the XML column comprises:

include information on the second entity in the XSD;

include information on any subtype entity of the second entity in the XSD;

include information on any supertype entity of the second entity in the XSD; and include information on any child entity of a relationship referencing the second entity as parent in the XSD.

11. The computer program product of claim 10, wherein the program code executable by the processor to include the information on any subtype of the second entity in the XSD further comprises: recursively include information on any subtype entity of the subtype entity in the XSD.

12. The computer program product of claim 10, wherein the program code executable by the processor to include the information on any supertype of the second entity in the XSD further comprises: recursively include information on any supertype entity of the supertype entity in the XSD.

13. The computer program product of claim 10, wherein the program code executable by the processor to include the information on any child entity of a relationship referencing the second entity as parent in the XSD comprises: recursively include information on any child entity of a relationship referencing the second entity as parent in the XSD.

14. The computer program product of claim 10, wherein the program code executable by the processor to include the information on any supertype or subtype entity of the second entity comprises: recursively include information on any child entity of a relationship referencing the supertype or subtype entity as parent.

15. The computer program product of claim 9, wherein the program code executable by the processor further comprises:
provide the physical data model comprising a fourth annotation of a first XML column marking the first XML column as not to be transformed as an entity and a fifth annotation of a second XML column marking the second XML column as to be transformed as an entity; and
transform the physical data model to a second ER-XML hybrid data model, comprising:
based on the fifth annotation of the second XML column marking the second XML column as to be transformed as an entity, transform the second XML column to a first entity in the second ER-XML hybrid data model;
create at least a second entity in the second ER-XML hybrid data model for contents of an XSD associated with the second XML column; and
based on the fourth annotation of the first XML column marking the first XML column as to be transformed to an entity, transform the first XML column as a XML attribute in a parent entity and associated with the same XSD as the second XML column.

16. A system comprising:
a processor; and
a computer readable storage medium having computer readable program code embodied therewith, the program code executable by a processor to:
provide an entity-relationship (ER)-extensible markup language (XML) hybrid data model of a relational database comprising XML data;
receive a user setting of a first annotation of a first entity in the ER-XML hybrid data model marking the first entity as not to be transformed as XML data;
receive a user setting of a second annotation of a second entity in the ER-XML hybrid data model marking the second entity as to be transformed as XML data;
transform the ER-XML hybrid data model to a physical data model of the relational database, comprising:
based on the first annotation of the first entity marking the first entity as not to be transformed as XML data, transform the first entity in the ER-XML hybrid data model to a first table in the physical data model;
based on the second annotation of the second entity marking the second entity as to be transformed as XML data, determine whether the second entity has a parent entity in the ER-XML hybrid data model with a third annotation marking the parent entity as not to be transformed as XML data; and
in response to determining that the second entity has the parent entity with the third annotation marking the parent entity as not to be transformed as XML data:
transform the second entity and a transitive closure of the second entity to an XML column in a second table in the physical data model, the second table representing the parent entity in the ER-XML hybrid data model marked as not to be transformed as XML data;
generate an XML schema document (XSD) for the XML column; and
associate the XSD with the XML column in the physical data model.

17. The system of claim 16, wherein the program code executable by the processor to generate the XSD for the XML column comprises:
include information on the second entity in the XSD;
include information on any subtype entity of the second entity in the XSD;
include information on any supertype entity of the second entity in the XSD; and
include information on any child entity of a relationship referencing the second entity as parent in the XSD.

18. The system of claim 17, wherein the program code executable by the processor to include the information on any subtype of the second entity in the XSD further comprises: recursively include information on any subtype entity of the subtype entity in the XSD.

19. The system of claim 17, wherein the program code executable by the processor to include the information on any supertype of the second entity in the XSD further comprises: recursively include information on any supertype entity of the supertype entity in the XSD.

20. The system of claim 17, wherein the program code executable by the processor to include the information on any supertype or subtype entity of the second entity comprises: recursively include information on any child entity of a relationship referencing the supertype or subtype entity as parent.

* * * * *